(12) United States Patent
Klein

(10) Patent No.: US 9,555,542 B2
(45) Date of Patent: Jan. 31, 2017

(54) HIGH EFFICIENCY STRUCTURAL BUILDING SYSTEM FOR ROBOTICS

(71) Applicant: Gary Gordon Klein, Chehalis, WA (US)

(72) Inventor: Gary Gordon Klein, Chehalis, WA (US)

(*) Notice: Subject to any disclaimer, the term of this patent is extended or adjusted under 35 U.S.C. 154(b) by 0 days.

(21) Appl. No.: 14/975,122

(22) Filed: Dec. 18, 2015

(65) Prior Publication Data

US 2016/0176042 A1    Jun. 23, 2016

Related U.S. Application Data

(60) Provisional application No. 62/124,606, filed on Dec. 23, 2014.

(51) Int. Cl.

| | |
|---|---|
| *B25J 9/00* | (2006.01) |
| *B62D 21/12* | (2006.01) |
| *B23B 49/02* | (2006.01) |
| *B25J 9/08* | (2006.01) |
| *B62D 29/00* | (2006.01) |
| *B62D 29/04* | (2006.01) |

(52) U.S. Cl.
CPC .............. *B25J 9/0009* (2013.01); *B23B 49/02* (2013.01); *B25J 9/08* (2013.01); *B62D 21/12* (2013.01); *B23B 2251/241* (2013.01); *B62D 29/008* (2013.01); *B62D 29/048* (2013.01); *Y10S 901/01* (2013.01); *Y10S 901/50* (2013.01)

(58) Field of Classification Search
CPC ............ B25J 9/0009; B25J 9/08; B23B 49/02; B23B 2251/241; Y10S 901/01; Y10S 901/50; B62D 21/12; B62D 21/02; B62D 21/008; B62D 21/048
See application file for complete search history.

(56) References Cited

U.S. PATENT DOCUMENTS

| | | |
|---|---|---|
| 3,612,585 A | 10/1971 | Mayr |
| 3,785,098 A | 1/1974 | Schweitzer et al. |
| 4,444,523 A | 4/1984 | Stumpf |
| 4,711,437 A | 12/1987 | Longenecker et al. |

(Continued)

FOREIGN PATENT DOCUMENTS

| | | |
|---|---|---|
| DE | 4420978 | 7/1996 |
| DE | 102012104252 | 11/2013 |

(Continued)

*Primary Examiner* — Drew Brown
(74) *Attorney, Agent, or Firm* — George A. Leone; Citadel Patent Law

(57) ABSTRACT

A robotic building system includes a first through third sets of extruded elements integrally joined at lengthwise edges and corners to rails. The second set of extruded elements has at least three adjoining sides surrounding a hollow opening, where each side is integrally joined to a rail. A third set of extruded elements has an asymmetrical inside angle shaped element formed by a first web and a second web oriented generally perpendicular to the first web, where each web is integrally affixed between a pair of opposing rails and each web shares a common rail. The rails may be tapped or drilled to accept a fastener, and each extruded element of the first set, second set and third set of extruded elements are adapted to be flush mounted to any of the other extruded elements or to the same shape extruded elements.

26 Claims, 14 Drawing Sheets

(56) References Cited

U.S. PATENT DOCUMENTS

| | | | |
|---|---|---|---|
| 5,475,961 A | 12/1995 | Menchetti | |
| 6,219,989 B1 | 4/2001 | Tumura | |
| 6,286,868 B1 * | 9/2001 | von Mayenburg | B62D 21/03 280/785 |
| 6,299,210 B1 * | 10/2001 | Ruehl | B62D 21/02 280/785 |
| 6,412,243 B1 | 7/2002 | Sutelan | |
| 6,435,584 B1 * | 8/2002 | Bonnville | B62D 24/00 280/781 |
| 6,681,489 B1 * | 1/2004 | Fleming | B62D 21/12 280/785 |
| 7,152,449 B2 | 12/2006 | Durney et al. | |
| 7,637,076 B2 | 12/2009 | Vaughn | |
| 9,133,867 B2 | 9/2015 | Lang | |
| 2004/0187426 A1 | 9/2004 | Callahan | |

FOREIGN PATENT DOCUMENTS

| | | |
|---|---|---|
| EP | 1104826 | 6/2001 |
| FR | 1422576 | 12/1965 |
| WO | WO2011152741 | 12/2011 |

\* cited by examiner

HIGH EFFICIENCY STRUCTURAL BUILDING SYSTEM FOR ROBOTICS

CROSS-REFERENCE TO RELATED APPLICATION

This application is a non-provisional application of U.S. Provisional Patent Application No. 62/124,606, filed Dec. 23, 2014, entitled "HIGH EFFICIENCY STRUCTURAL BUILDING SYSTEM FOR ROBOTICS," to the same inventor herein and claims the priority benefit of that filing date. Application No. 62/124,606 is incorporated by reference.

TECHNICAL FIELD

The present invention relates to a high efficiency structural building system for robotics, and, more particularly to a set of extruded structural elements for building lightweight, high-strength robotic devices of various configurations.

BACKGROUND

Currently, robotic frameworks must be built using multiple connection mechanisms including, for example, corner brackets, T brackets, fasteners with nuts, and/or welds for joining the frame members. A high efficiency structural system for building robots is needed to eliminate complications caused by these components. For example, one problem with using fasteners with nuts is that both front and rear sides of the components must be accessible to make the assembly. Often the interior of robot is obscured with the framework, motors, gearboxes, pneumatic cylinders and other actuators making it difficult to place and tighten a nut on the inside. Bolting a structure together with brackets adds unwanted cost, weight, and complexity to the structure. Brackets require added space in the structure, as compared to a directly bolted configuration. Consequently, as a load transfers from a frame member to a bracket and then back to another frame member, there is an undesirable reduction in stiffness and possibly strength compared to a directly bolted version.

While welding provides a direct attachment, it is not a precise fastening method. Prior to a weld being applied, parts must be aligned and clamped in place before welding, and even then the welding process will create substantial distortion in the finished structure. This is especially true with respect to welding aluminum alloys, since the coefficient of thermal expansion in aluminum is higher than most other commonly used metals such as steel and steel alloys. Typically, after a weld puddle cools and solidifies, it shrinks substantially. The shrinkage causes an undue amount of residual stress and distortion. As a further drawback, welding aluminum alloys also results in considerable reduction in the strength properties of the aluminum alloy in the heat affected area adjacent to the weld.

Although welding steel does not pose the same challenges as aluminum, most robotics builders avoid using heavier steel components for robot structures. Meeting weight limits in robot competitions with a steel frame is difficult since steel, with approximately 3 times the density of aluminum, has too much mass for a given shape.

Welding repairs and modifications are also problematic. Robots, particularly with respect to competitive builds, are often disassembled and reassembled several times to make modifications and repairs since the teams building the robots are usually on a steep learning curve. Multiple assembly and disassembly procedures are much more convenient with removable fasteners than with a welded structure.

The present disclosure provides new and novel solutions to overcome problems inherent in the prior art with a new and novel method and system allowing the ability to easily design and fabricate complex, lightweight, robust structures without the use of brackets, lugs, t-nuts, nuts or similar fasteners.

BRIEF SUMMARY OF THE DISCLOSURE

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A robotic building system is provided that includes a first set of extruded elements having opposing lengthwise ends each end integrally joined to a rail or rectangular cross-sectional column. A second set of extruded elements has at least three adjoining sides surrounding a hollow opening, where each side is integrally joined to a rail or rectangular cross-sectional column. A third set of extruded elements has an asymmetrical inside angle shaped element formed by a first web and a second web oriented generally perpendicular to the first web, where each web is integrally affixed between a pair of opposing rails or rectangular cross-sectional columns and each web shares a common rail or rectangular cross-sectional column. The rail or rectangular cross-sectional column is adapted to be tapped or drilled to accept a fastener, and each extruded element of the first set, second set and third set of extruded elements are adapted to be flush mounted on at least one surface to any of the other extruded elements or to the same shape extruded elements.

Other benefits and advantages of the present invention will become apparent from the disclosure, claims and drawings herein.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

Figure 1:
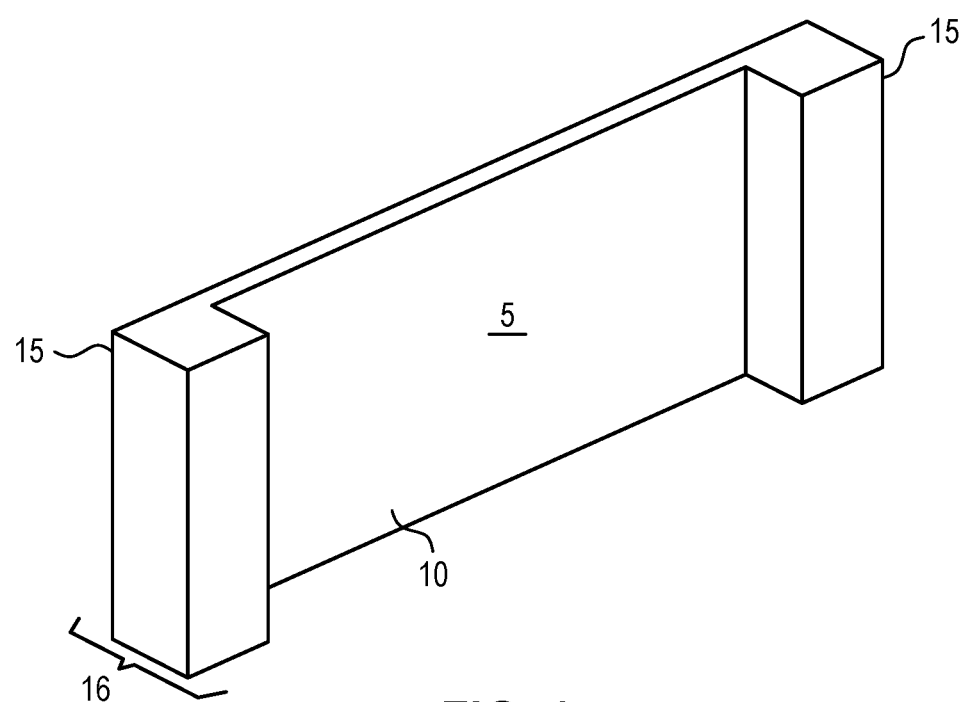
FIG. 1 schematically shows an example of a short piece of a flat extruded shape, herein sometimes called a track element.

In the drawings, identical reference numbers identify similar elements or components. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE PREFERRED EMBODIMENTS

The following disclosure describes several embodiments and systems for a highly efficient robotic building system. Several features of methods and systems in accordance with example embodiments are set forth and described in the Figures. It will be appreciated that methods and systems in accordance with other example embodiments can include additional procedures or features different than those shown in the Figures. Example embodiments are described herein with respect to extruded structural elements for robotics. However, it will be understood that these examples are for the purpose of illustrating the principles, and that the invention is not so limited. Additionally, methods and systems in accordance with several example embodiments may not include all of the features shown in the Figures.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one example" or "an example embodiment," "one embodiment," "an embodiment" or various combinations of these terms means that a particular feature, structure or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

"Axis" as used herein means a central axis running lengthwise through an elongated element.

"Cross Sections" of elements as used herein mean a cross section taken as a slice through a geometric shape along a plane perpendicular to the lengthwise dimension of an extruded shape or perpendicular to the direction of extrusion, unless context indicates otherwise.

"Flush" as used herein means evenly mounting or attaching at least one surface to another surface with little or no gap between the surfaces.

The building system disclosed herein includes a group of extruded metal shapes that are inexpensive, lightweight, high strength and easily assembled into custom structural members, mechanisms and supports, with a tool for creating these structures that does not require large or expensive machine shop equipment. The shapes can be flat, angle, triangular or rectangular hollow tube configurations.

One intended use is for robotics for student competitions such as, for example, First Robotics Competition, an international high school robotics competition. Other applications may be found for commercial or industrial uses. With respect to robotics competitions, these typically put a weight limit on the robot, as well as limits on motors and batteries which can be used. As a result, the ability to easily create a lightweight and robust structure is very important for meeting the needs of the robot designers. The lighter the structure, the faster it will maneuver and accelerate.

In order to facilitate a directly fastened structure, each structural shape has at least one relatively thin web which consists of a substantially flat plate adjoining a more substantial square or rectangular edge, edges, corner or corners. The edges or corners have sufficient cross section material to allow axial drilling and tapping substantial holes in the cut off ends of the extruded shape for fasteners to be directly attached from the ends. Aluminum or magnesium alloy extrusions can be easily and accurately cut to length and desired angle with a relatively inexpensive portable miter saw intended for wood working. The reinforced edges and corners also have sufficient material thickness to drill and tap for a threaded connection from the edges and sides of the extrusions. In the special case of the triangular hollow, the corners of the triangular hollow shape would be polygonal and/or semicircular in section.

The thickness of the flat plate or web connecting the square or rectangular corners may be less than ½ the thickness of the smaller of the dimensions of the rectangular edge or corner. Because the mass is concentrated in the edges and corners of the shapes, each shape has higher structural stiffness and strength in bending and torsion than an equal mass and similar overall dimension corresponding flat bar, angle or constant wall thickness tube shape. The enhanced and reinforced edges and corners also allow for drilling and tapping holes in the side or edge of the shapes as well as the ends to allow for easy design and fabrication of frameworks. The corresponding size and mass of typical and commercially available flat, angle or tube shapes would not have sufficient wall thickness to provide adequate thread diameter and thread depth to do this. If the same overall dimension of commercially available flat, angle or tube were used with sufficient wall thickness to allow the safe or robust drilling and tapping of holes for fasteners, then the overall mass would be much greater. A rule of thumb for tapped holes in aluminum alloys is that the thread engagement depth should be about 2 times the thread diameter. For steel alloys the rule of thumb says the depth needs to be about 1.5 times the thread diameter.

In one useful configuration preferred for robotics competition, the edges and corners are square in cross-sectional shape except for the special case of the triangular hollow section, and the thickness of the web connecting them is less than ⅓ the square dimension. In the preferred configuration the web is not centered on the square shape, but aligned with one edge creating one flat face on one side and a shallow channel shape on the other side. This makes it more convenient to attach other mechanical parts such as electronics, motors, servos, gear transmissions, solenoids, air and hydraulic cylinders and other brackets, actuators and sensors. The square edge and corner shapes may be, for example, at least 5/16 inch in each dimension and the flat, angle and tube dimensions have at least one cross section dimension greater than 1.25 inch. A most useful configuration uses extruded and heat treated structural aluminum alloy for economy, precision, light weight and high structural performance.

Referring now to FIG. 1, an example of a short piece of the flat extruded shape, herein called a track element, is schematically shown. The track element 5 includes a flat web 10 between a pair of opposing elongated square columns or rails 15. In one example, the elongated square columns or rails 15 are each located on one of two opposing lengthwise edges of the track element 5. In one example, the square columns or rails advantageously may have sides 16 of about 3/8 inch and the flat web between the squares has a thickness of about 0.1 inch thick. The overall outside width of the shape from rail end to rail end may advantageously be about 3 inches. The length may be any desirable length. The mass of the example extrusion is about 0.6 pounds per foot of length. Using 3/8 inch squares allow for a #10-32 or a 5 mm×0.8 mm threaded hole to be drilled and tapped with a sufficient amount of thread depth into the edges, ends or sides of the square shape.

Figure 2:
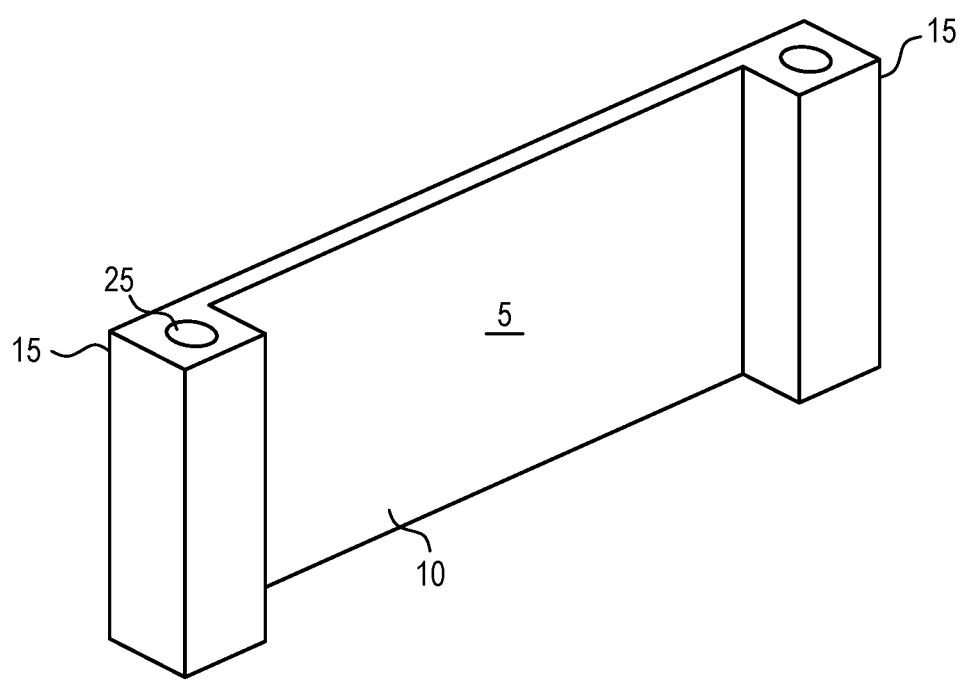
FIG. 2 schematically shows an example of a modified track element.

Referring now to FIG. 2, an example of a modified track element of FIG. 1. A hole 25 is extruded into the reinforced rail 15 on each edge to facilitate attaching a threaded fastener from the end as shown. This eliminates the necessity of drilling the end of the shape in order to tap it. It also makes the shape a little lighter weight. The same extruded hole can also be applied to the edges and corners of other shapes.

Figure 3B:
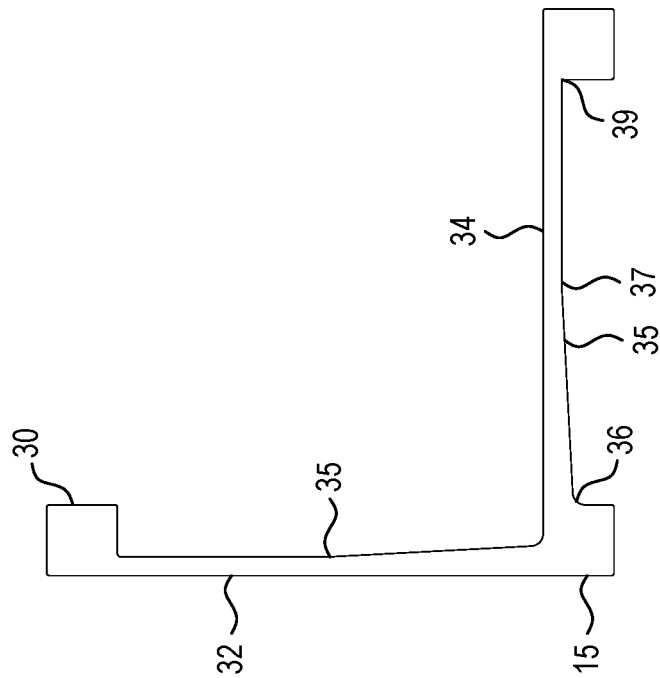
FIG. 3B shows a cross-sectional view of the structural element of FIG. 3A.
Figure 3A:
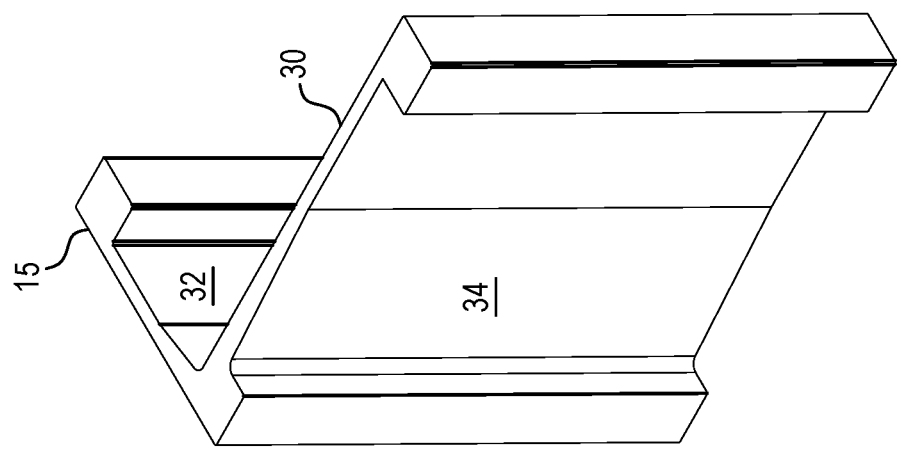
FIG. 3A schematically shows an example a section of an extruded asymmetrical angle shape.

Referring now to FIG. 3A, an example a section of an extruded asymmetrical angle shaped element is schematically shown. An extruded asymmetrical angle shaped element 30 comprises a first web 32 and a second web 34 oriented generally perpendicular to the first web 32. The first web 32 is bordered on opposing lengthwise edges by a pair of opposing elongated square columns or rails 15 similar to those described above with respect to the track element 5. The second web 34 is bordered on opposing lengthwise edges by a pair of opposing elongated square columns or rails 15 where one of the elongated square columns forms a corner between the first web 32 and the second web 34. The corner rail is common to each web. Each of the first and second webs are tapered as described in more detail below with respect to FIG. 3B.

FIG. 3B shows a cross-sectional view of the structural element of FIG. 3A. In one example, the elongated square columns on each edge of the element and in the corner of the shape may advantageously be about 3/8 inch on each side. The first and second webs may have a tapered region 35 that may advantageously be about 0.12 inch-thick at the corner 36 tapering down to about 0.08 inches thick in the center 37 and continuing at 0.08 inches thick to each edge 39. The tapered region 35 provides additional stiffness and bending strength to the shape with only a small increase in mass. The overall dimensions of the shape may be about 2×2.25 inches. The mass of the extrusion is about 0.79 pounds per foot of length. The extruded asymmetrical angle shaped element 30 has multi-function properties. In longer lengths it can be used as a highly efficient structural element in frameworks. It can be used in short pieces as a spacer or an angle bracket to mount gear motors, solenoids or air cylinders. Gear motors or air cylinders can be mounted to the flat surface on the inside of the angle for a protected or compact mounting. Gear motors, bearings for shafts or air cylinders can also be mounted to the exterior flat surface if that is desired.

Figure 4:
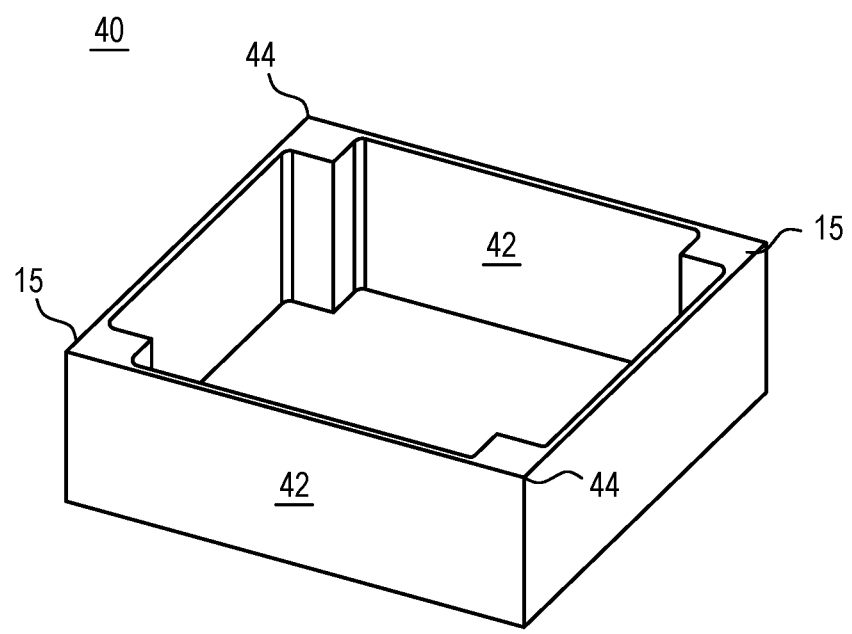
FIG. 4 schematically shows an example of an extruded hollow square shape.

Referring now to FIG. 4, an example of an extruded hollow rectangular shaped element is schematically shown. An extruded rectangular element 40 has a generally square cross-sectional shape including four equal sides comprising webs 42. Each web 42 spans between a pair of opposing elongated square columns or rails 15, each located in a corner 44 of the extruded square element 40.

In one useful example, the rails on each corner of the shape are about 3/8 inch on each side. Each web between the rails is about 0.063 inch thick. The overall dimensions are about 3 inches square. The mass of the extrusion is about 1.32 pounds per foot of length. This creates a lightweight tube structure with better mechanical properties of both bending and torsion stiffness and strength than the same 3 inch square size tube of equal weight made with a 0.097 inch constant wall thickness. Moving some of the material into the corners of the shape improves the beam properties of the shape. The combination of the light weight and high mechanical properties with the ability to bolt directly to the ends and edges of the tube is highly beneficial for a person attempting to build a lightweight robust structure very simply and quickly. Of course the length of the extrusion depends upon the application as is the case with all of the extrusions disclosed herein.

Figure 5:
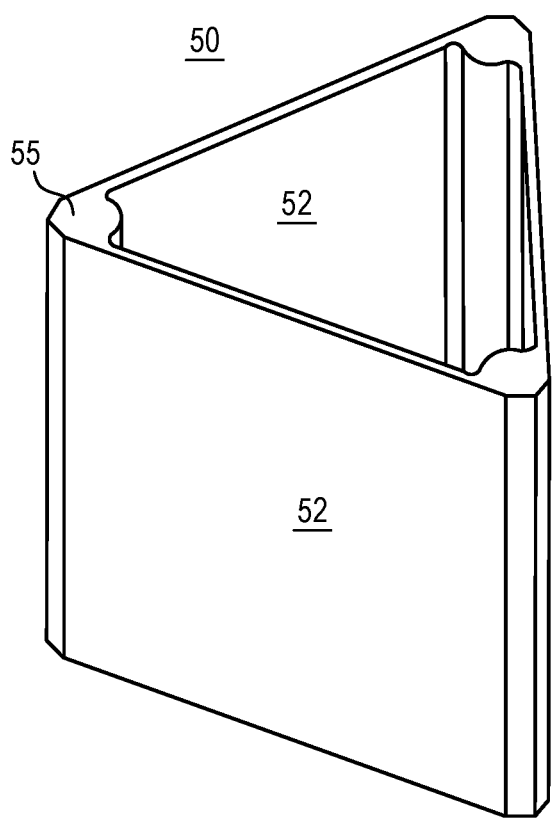
FIG. 5 shows an example of an extruded hollow triangle shape.

Referring now to FIG. 5 an extruded hollow triangular-shaped element is schematically shown. An extruded hollow triangular-shaped element 50 having a substantially triangular cross-section includes a plurality of first through third webs 52 each spanning between a pair of opposing interior elongated corner columns 55.

Because of the special case of the triangular shape, in the preferred configuration, the squares on each corner of the other shapes are replaced by columns having a semi-circular cross-section in each corner. Each semi-circular cross-section has about a 3/8 inch diameter. The web between the corners is about 0.063 inch thick. The overall dimensions of the shape are about 3 inches on each side. The mass of the extrusion is about 0.94 pounds per foot of length. The triangular corners are truncated so they will fit and work with the drilling and tapping tool, shown in FIGS. 12 and 13.

Figure 6:
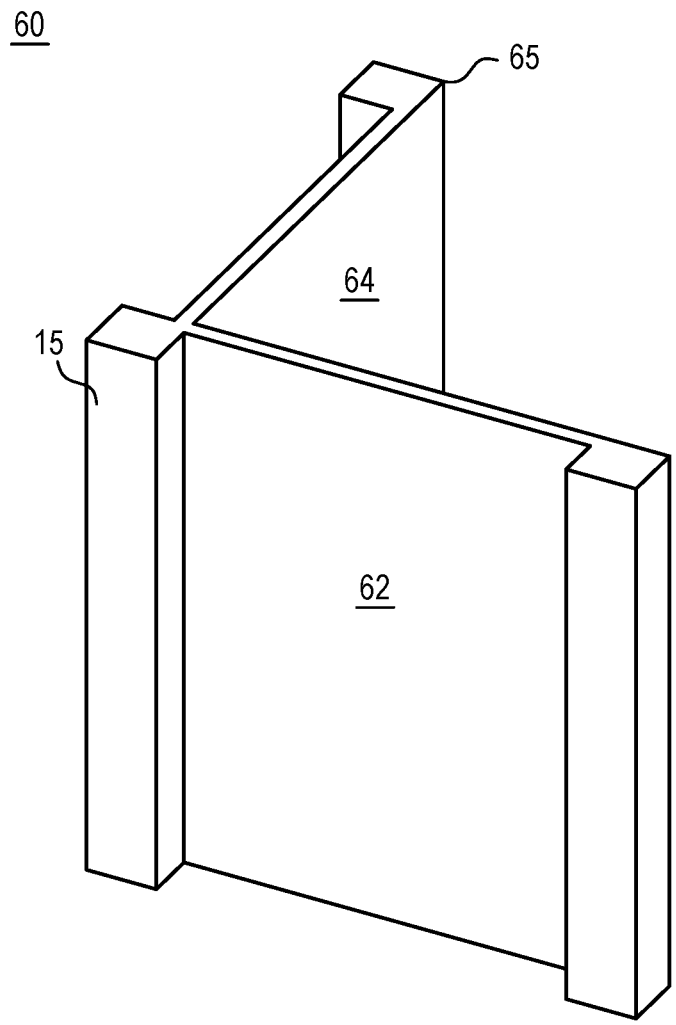
FIG. 6 shows an example of a symmetric inside angle shaped element.

Referring now to FIG. 6, an example of an extruded symmetric inside angle shaped element is schematically shown. An extruded symmetric inside angle shaped element 60 includes a first web 62 and a second web 64 oriented generally perpendicular to the first web 62. The first web 62 is bordered on opposing lengthwise edges by a pair of opposing elongated square columns or rails 15 similar to those described above with respect to the track element 5. The second web 64 is bordered on opposing lengthwise edges by a pair of opposing elongated square columns or rails 15 where one of the elongated square columns is located adjacent to an inside corner angle 65 between the first web 62 and the second web 64 and is common to both webs. Each of the opposing elongated square columns or rails 15 project outwardly with respect to the inside corner angle 65.

In one useful example for robotics, the web may be about 0.1 inch thick. The lengthwise edges and corner have a width of about 0.375 inches on each side of the square column. The overall width and depth are 3 inches. The mass is about 1.02 pounds per foot. The extruded symmetric inside angle shaped element 60 shape is useful for mounting something square in shape into the inside of the angle.

Figure 7:
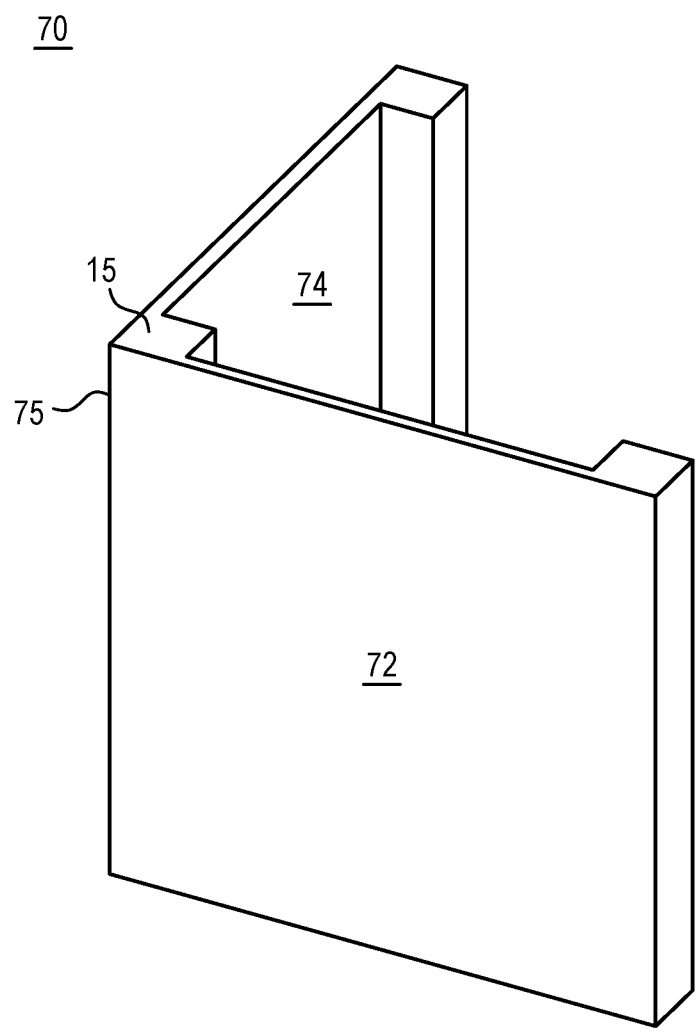
FIG. 7 shows an example of an extruded symmetric outside angle shaped element.

Referring now to FIG. 7, an example of an extruded symmetric outside angle shaped element is shown. An extruded symmetric outside angle shaped element 70 includes a first web 72 and a second web 74 oriented generally perpendicular to the first web 72. The first web 72 is bordered on opposing lengthwise edges by a pair of opposing elongated square columns or rails 15 similar to those described above with respect to the track element 5. The second web 74 is also bordered on opposing lengthwise edges by a pair of opposing elongated square columns or rails 15, where one of the elongated square columns is located within an inside corner angle 75 between the first web 72 and the second web 74 and is thus common to both. Each of the opposing elongated square columns or rails 15 project inwardly with respect to the outside corner angle 75.

In one useful example for robotics, each web may be about 0.1 inch thick. The lengthwise edges and corner have a width of about 0.375 inches on each side of the square column. The overall width and depth are 3 inches. The mass is about 1.02 pounds per foot. The extruded symmetric outside angle shaped element 70 has the benefit of being smooth and continuous on the exterior surface.

Figure 8A:
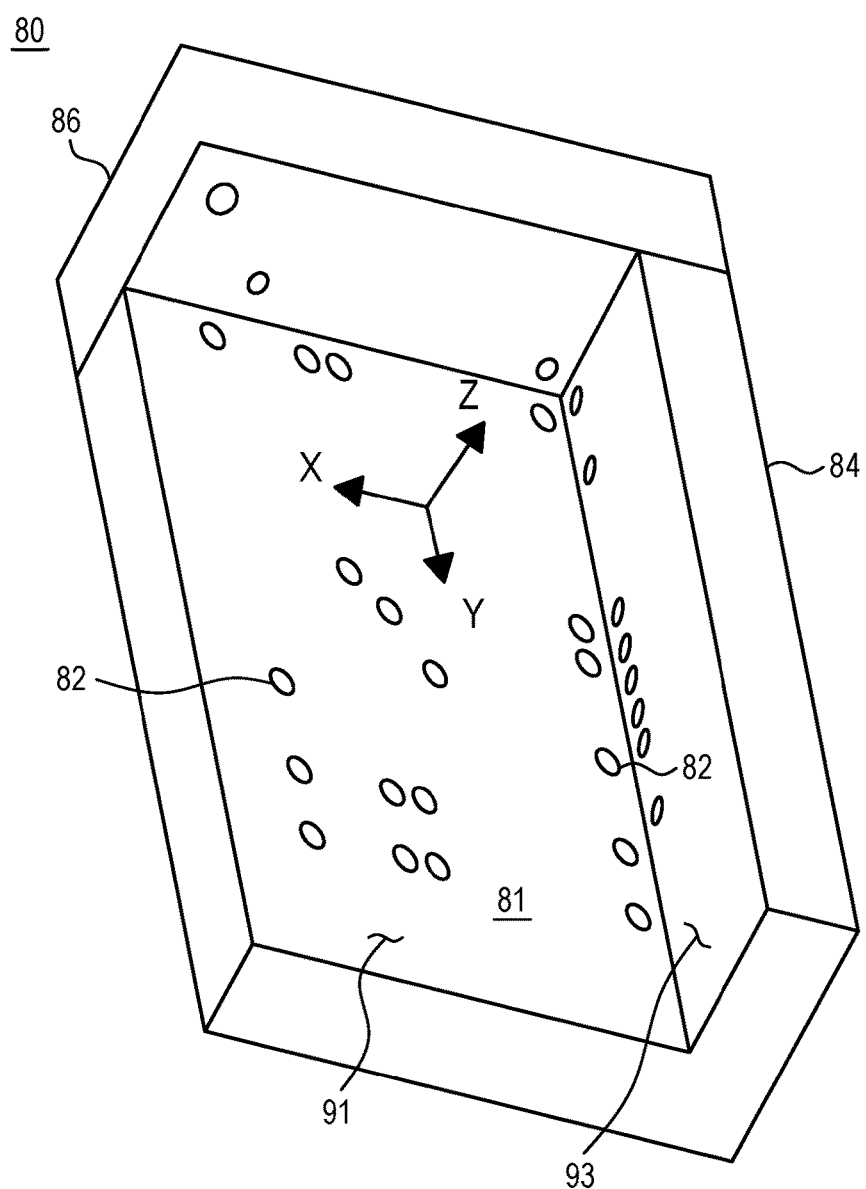
FIG. 8A schematically shows an isometric front view of an example of a fabrication tool designed to guide a drill bit.
Figure 8B:
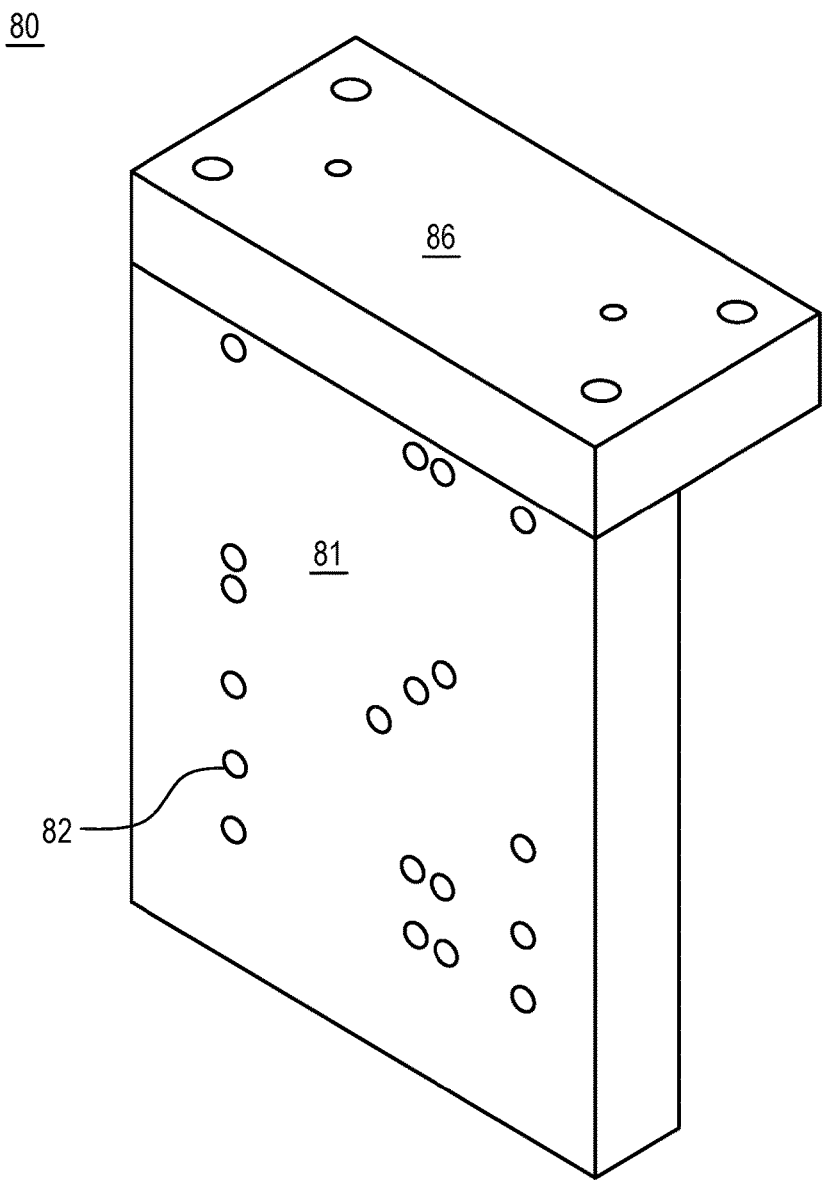
FIG. 8B schematically shows an isometric back view of the example of a fabrication tool designed to guide a drill bit as shown in FIG. 8A.

Referring now jointly to FIG. 8A and FIG. 8B, an isometric front view and an isometric back view of an example of a fabrication tool are respectively shown. The fabrication tool 80 has been designed to guide a drill bit. In FIG. 8A the X, Y and Z coordinates are shown to orient the viewer. The X and Y axes lie within a planar surface 91 and the Z axis projects perpendicularly outwardly from that plane. In use, the tool facilitates drilling or tapping holes that are accurately centered and aligned on axis with square shapes on the ends of lengthwise edges and corners of the extrusions and at right angles on the lengthwise edges and sides of the extrusions. The fabrication tool 80 includes a pattern of holes 82 closely fitting the appropriately sized drill bits (not shown) to facilitate attaching the different shaped elements described herein at right angles to the side of selected extrusion elements.

In one useful example, the fabrication tool 80 may be made from an integral solid metal piece or extrusion comprising a first block 81, a second block 84 and a top plate 86. The first and second blocks may advantageously have rectangular shaped faces such as planar surfaces 91, 93. The second block 84 is located at one edge of the first block substantially perpendicularly to the planar surface 91 so as to form a fastening corner 95 between the first and second blocks.

Figure 8C:
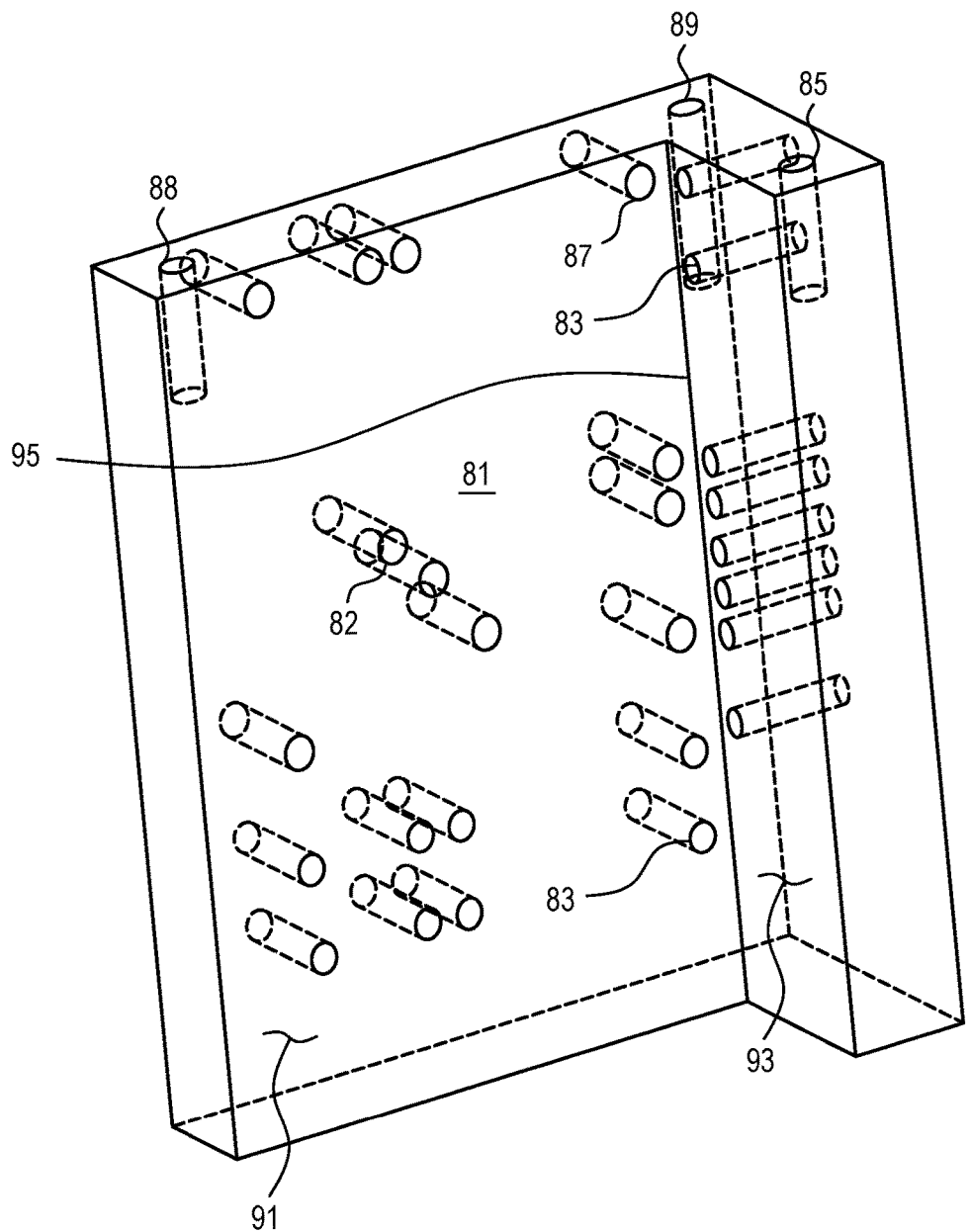
FIG. 8C shows the inside of a drilling and tapping tool with the top plate removed.

Referring now to FIG. 8C, a fabrication tool with the top plate removed is schematically shown. The plurality of holes 82 include sets of holes for various functional drilling and/tapping including a set of tap guide holes 83, a set of tap drill holes 85, a set of bolt clearance holes 87, a set of threaded holes 88 for fastening the top plate, and at least one alignment dowel pin hole 89.

The plurality of holes 82 are each sized as through holes so that fasteners can bolt through the shape into the end of an abutting next shape. This allows the fabrication to be done accurately with a hand drill or small drill press and hand tools. Without the special fabrication tool or a milling machine, it is difficult to accurately locate the needed holes and to drill them at right angles to the surface. The intent is to allow students in a classroom situation without access to a fully equipped machine shop to build high quality, precision robotic structures.

Having described the fabrication tool design, a method for using the fabrication tool will now be described. For drilling and tapping the ends of the extruded elements a selected extruded element is clamped into the corner so the tap drilling guide hole on the top plate lines up with the center of the square edge or corner. A C-Clamp or other typical shop type clamping method is suitable to hold the extrusion in place in the tool. Then the tap drill is used to drill the hole. To tap the hole, the top plate is unfastened and rotated 180 degrees, refastened, the extrusion with the tap hole drilled is clamped back into the corner and the tap guide hole is then used to guide the tap straight into the previously drilled hole. There are two bolt holes to attach the top plate, and one dowel pin in the corner to accurately locate the plate so the tapped hole is centered on the extrusion edges and corners. Typically, all the tap holes will be drilled first, then the tool changed to guide the tap to tap all of the holes previously drilled. That saves time over removing and reinstalling the top plate for each hole.

For drilling and tapping the edges and corners of some selected elements, the top plate is not needed and can be removed from the tool. If left on, it will restrict the placement of holes for example in the center of a longer piece of extrusion.

Again, the shape is clamped into the inside corner of the tool with a suitable clamping means. This time the position of the tool along the shape needs to be adjusted to place the tapped holes in the required positions. Once clamped, there are multiple tap drill holes which are accurately centered on the edge or corner of the square. They are spaced so that they will line up with holes centered on the squares of the other shapes available. For example, the tap holes may be located so that they will line up with holes on centers of the squares for the 2 inch, 2.25 inch and 3 inch extruded elements as described above. Once the tap holes are drilled, the tool is moved a defined distance, in this case 0.7 inches, in order for the tap guide holes to line up with the previously drilled holes.

In one example, for drilling and tapping holes in the side of an extrusion element the extrusion element is clamped into the corner of the tool. There are four tap drill holes in a lateral row on the side of the tool with four tap guide holes in a row underneath them. The holes are again spaced to accurately center the holes on the 2, 2.25 and 3 inch extruded shape square edges and corners or the truncated corners on the triangle shape. The tool needs to be adjusted along the length of the extrusion in order to place them in the desired location. The hole pattern will accurately center the holes on the squares, and also position them at a right angle to the axis of the extruded shape. After drilling the holes, the tool needs to be adjusted to line up the tap guide holes with the previously drilled holes. Then the holes are tapped using the tap guide holes.

To attach one of a selected extruded element at right angles to the side of another selected extruded element, there are a series of fastener through holes that accurately align with holes drilled and tapped into the ends of the squares of the selected extruded elements. In the example tool above, there are eleven of these holes intended to allow this type of assembly. There are three holes which will line up with the end holes in the triangle shape. There are four holes on a 2.625 inch square pattern which will line up with the tapped end holes on the 3 inch flat, 3 inch angle or 3 inch square tube shapes. There are four holes on a 1.625×1.875 rectangular pattern that will line up with the tapped end holes in the 2 inch flat or 2×2.25 inch angle shapes in a horizontal configuration. There are four holes on a 1.875×1.625 rectangular pattern that will line up with the tapped end holes in the 2 inch flat or 2×2.25 inch angle shapes in a vertical configuration, or in other words 90 degrees from the first orientation. To drill these holes, the tool without the top plate attached is clamped onto the extruded shape where the second shape is desired to be attached. The appropriate holes for attaching the second shape are drilled with the appropriate clearance drill for the fasteners being used. After all the needed holes are drilled, the tool is unclamped. The holes should align accurately with the holes tapped into the ends of the second shape, allowing a direct bolt up assembly. The method disclosed herein provides a robust, accurate, rigid and yet lightweight assembly system for robot frames and actuator assemblies.

Figure 9:
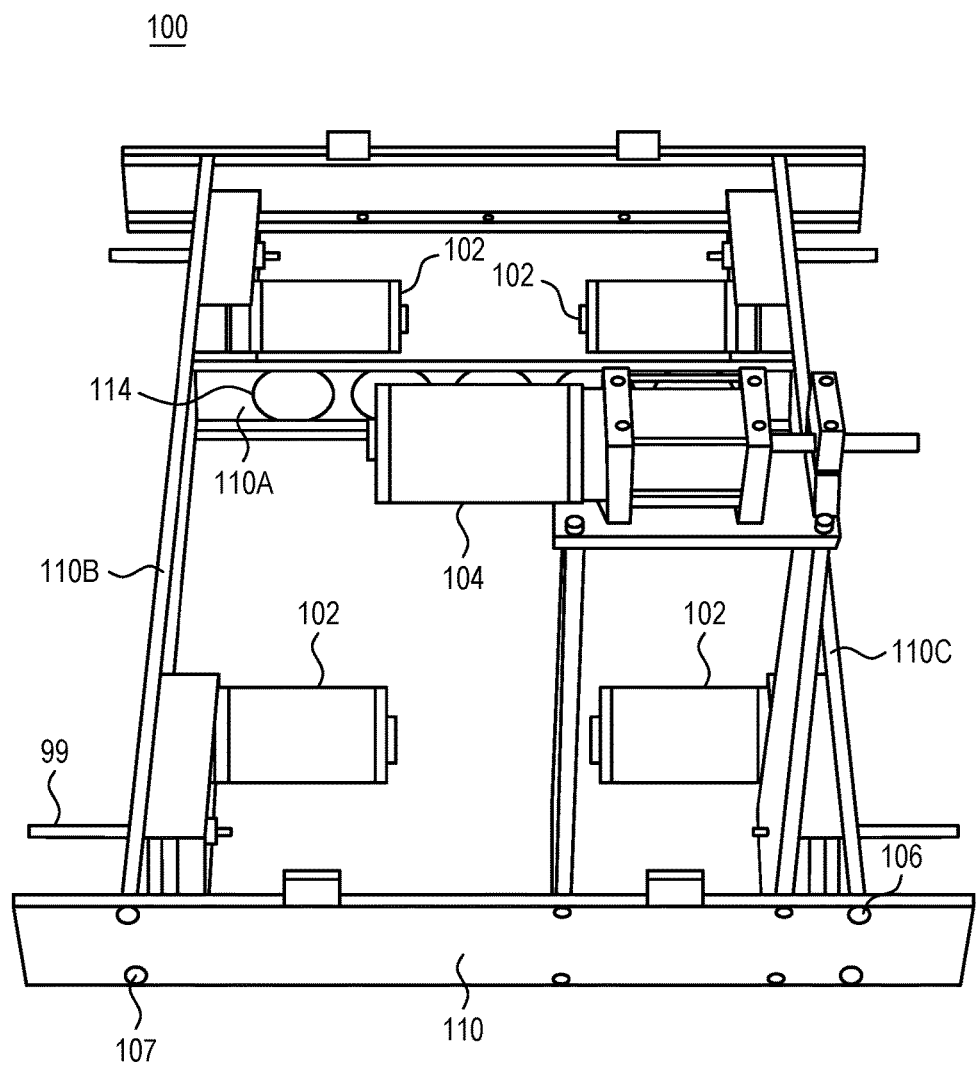
FIG. 9 shows a partially constructed robot base frame assembly made with flat extrusion shaped elements.

Referring now to FIG. 9, a partially constructed robot base frame assembly made with flat extrusion shaped elements is shown. A partial base frame 100 is shown here without side plates attached (these are shown below). The partial base frame 100 has a plurality of gear motors 102 where one is mounted in each of the four corners intended for driving the robot wheels. It also has an actuator motor 104 mounted above the base frame. The base frame 100 is assembled with fasteners 106 bolted directly into the ends and edges of extruded shaped track elements 110. It also shows a reinforcing brace advantageously made out of an extruded shaped track element 110A attached widthwise between opposing parallel extruded tack elements 110B, 110C. The brace 110A has been further lightened by drilling a series of holes 114 in the thin center web as for example, with an inexpensive hole saw. This is an easy and relatively fast method of further reducing the weight of the structure. Each of a plurality of fastener holes 107 on the exterior sides of the frame have been countersunk so that the fastener heads do not protrude from the frame. This makes for a clean appearance, and keeps the fastener heads from snagging or hanging up on other things, such as the bumpers that must be installed around the perimeter of a robot, for example. A set of axles 99 are individually coupled to the drive motors for driving the wheels (as shown in FIG. 11).

Figure 10:
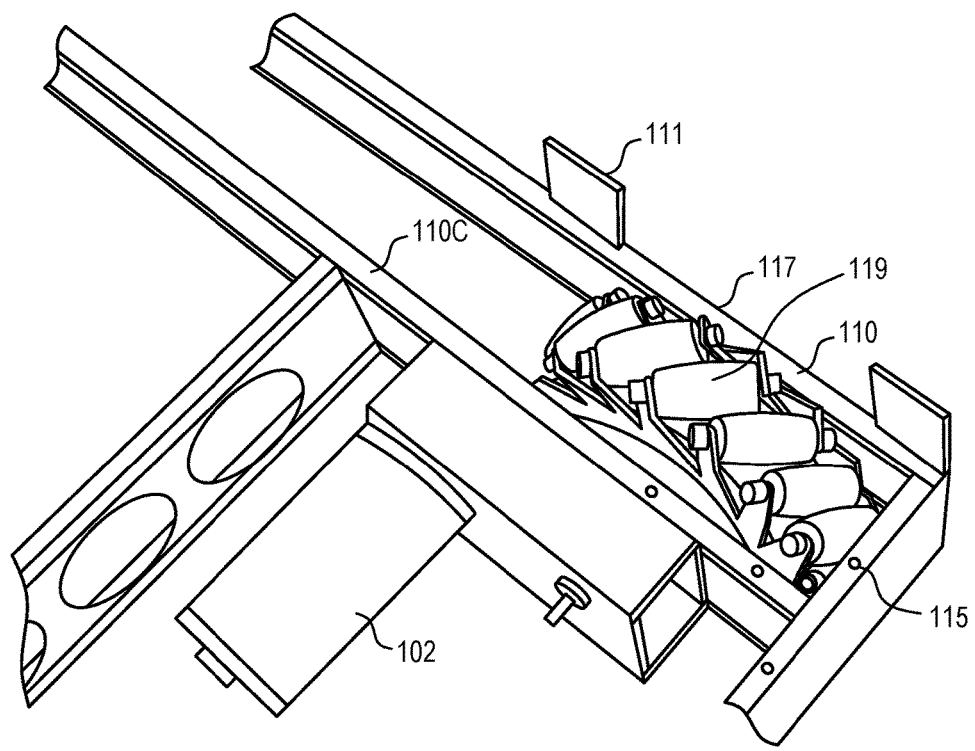
FIG. 10 shows one corner of the robot assembly.

Referring now to FIG. 10, one corner of the robot assembly is shown. A plurality of welded tabs 111 are included on a frame side plate 117 to support a (not shown) robot bumper when required, at a prescribed height above the ground. Note that the gear motor 102 is bolted directly to the flat extrusion 110C. Also shown are additional mounting holes 115 drilled and tapped into the top edge of the track extrusion frame rails for mounting further structures. A wheel 119 is mounted between the flat extrusion 110C and the frame side plate 117. Note that the fasteners holding the structure together in a flush configuration.

Figure 11:
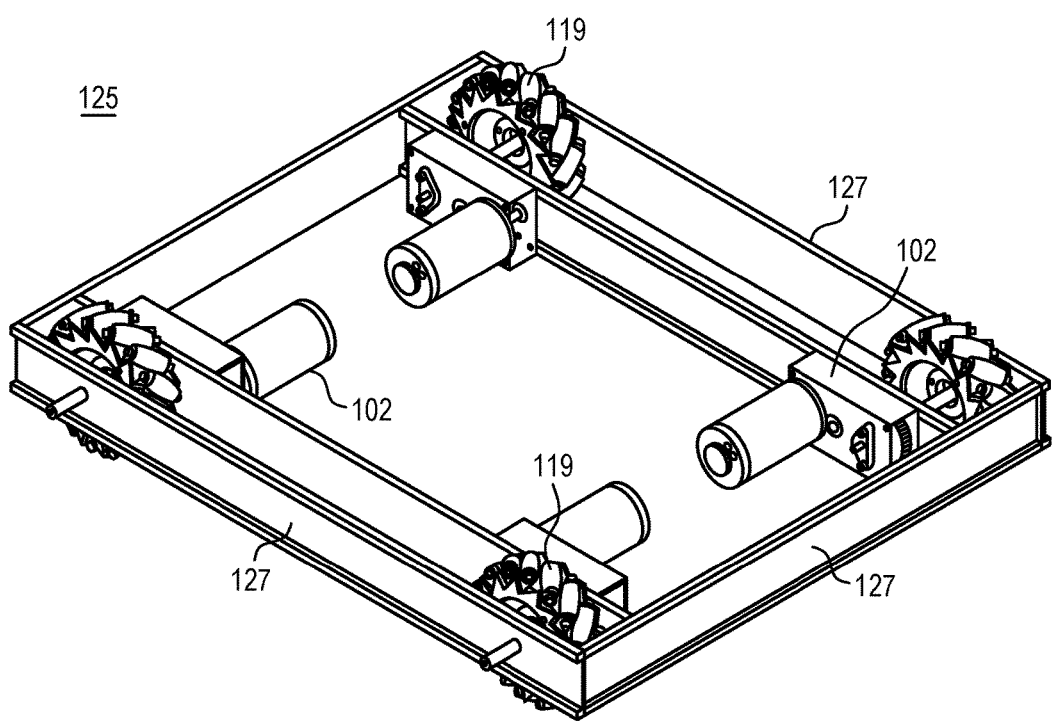
FIG. 11 schematically shows one example of a robot base frame with drive motors and actuator motors installed.

Referring now to FIG. 11, a robot base frame with drive motors and actuator motor installed is schematically shown. A robot base frame 125 includes a plurality of wheels 119, a plurality of drive motors 102, and frame elements 127 comprising extruded track elements, for example.

Figure 12:
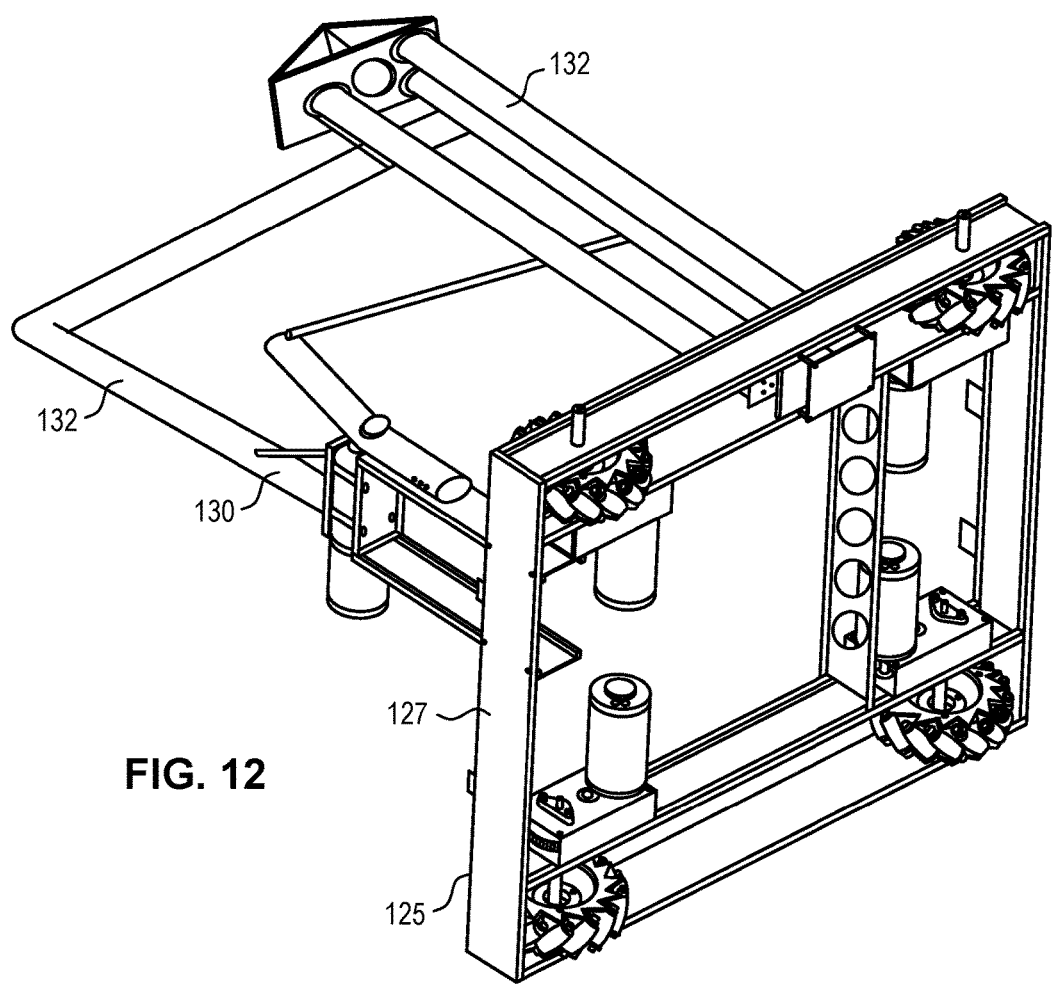
FIG. 12 shows the underside of a robot structure constructed in accordance with this disclosure.

Referring now to FIG. 12, the underside of a robot structure constructed in accordance with this disclosure is shown. A robot base frame 125 includes a plurality of extruded track elements 127, for example, and is affixed, by fasteners for example, to an upper robotic structure 130. The base frame is constructed substantially as described hereinabove. In one example, some of the extruded track elements are welded to lightweight round tubing 132 to create lightweight, large components which are then fastened with fasteners to the base frame. Since it is difficult to bolt or clamp directly to very thin wall round tubing, welding the tubing to the extruded shapes allows for a simple, robust mounting and light weight structure.

The above descriptions and preferred configurations are intended for a specific robotics challenge. For other uses, the same principle of design and the tool can be applied at different scales. So for smaller robots or equipment, the sections might be scaled down by ⅓ or ½ and use appropriately smaller fasteners and thread sizes. For larger equipment, the system may be scaled up. For example, the shape in FIG. 1 might be 6 inches in width and the squares about 0.75 inch square which would use ⅜ inch bolts for attachment. This would create a very robust structure with relatively light weight and ease of construction compared to other typical methods.

The invention has been described herein in considerable detail in order to comply with the Patent Statutes and to provide those skilled in the art with the information needed to apply the novel principles of the present invention, and to construct and use such exemplary and specialized components as are required. However, it is to be understood that the invention may be carried out by specifically different equipment, and devices, and that various modifications, both as to the equipment details and operating procedures, may be accomplished without departing from the true spirit and scope of the present invention.

What is claimed is:

1. A robotic construction system comprising:
   a first set of extruded elements having opposing lengthwise ends each end integrally joined to a rail or rectangular cross-sectional column;
   a second set of extruded elements having at least three adjoining sides surrounding a hollow opening, where each side is integrally joined to a rail or rectangular cross-sectional column;
   a third set of extruded elements having an angle shaped element formed by a first web and a second web oriented generally perpendicular to the first web, where each web is integrally affixed between a pair of opposing rails or rectangular cross-sectional columns and each web shares a common rail or rectangular cross-sectional column;
   wherein each rail or rectangular cross-sectional column is adapted to be tapped or drilled to accept a fastener; and
   wherein each extruded element of the first set, second set and third set of extruded elements are adapted to be flush mounted on at least one surface to any of the other extruded elements or to the same shape extruded elements.

2. The system of claim 1 wherein the first set of the extruded elements comprises a flat web spanning between a pair of opposing rails, where each rail is located on one of two opposing lengthwise edges of the flat web so that the opposing rails and one face of the web form a channel.

3. The system of claim 2 wherein the rails comprise opposing elongated square columns.

4. The system of claim 1 wherein the second set of the extruded elements comprises an extruded hollow rectangular shaped element having a generally rectangular cross-sectional shape including four webbed sides where each web spans between a pair of opposing elongated rectangular columns or rails, each rail located in a corner of the extruded hollow rectangular shaped element.

5. The system of claim 1 wherein the second set of the extruded elements comprises an extruded hollow triangular-shaped element having a substantially triangular cross-section including a plurality of first through third webs each spanning between a pair of opposing interior elongated corner columns.

6. The system of claim 1 wherein each of the first web and second web is tapered.

7. The system of claim 6 wherein the first web and second web have a tapered region that is thickest at an adjoining corner and tapers down to a predetermined thickness in the center and continues at the predetermined thickness to each opposite edge.

8. The system of claim 6 wherein thickness measured anywhere on the tapered region is less than half the dimension of any side of the rails.

9. The system of claim 1 wherein the third set of the extruded elements comprises:
an extruded symmetric outside angle shaped element including a first web and a second web oriented generally perpendicular to the first web;
wherein the first web is bordered on opposing lengthwise edges by a pair of opposing rails, and the second web is also bordered on opposing lengthwise edges by a second pair of opposing rails, where one of the rails is common to both opposing pairs and located within an inside corner angle between the first web and the second web; and
wherein each of the opposing rails project inwardly with respect to the outside corner angle.

10. A robotic assembly comprising:
a base frame assembly having a perimeter defined by a plurality of extruded elements constructed to form a generally rectangular base;
where each of the plurality of extruded elements has a flat web spanning between a pair of opposing rails, where each rail is located on one of two opposing lengthwise edges of the flat web;
where each of the plurality of extruded elements is flush mounted at both ends by fasteners screwed through the rails to two other extruded elements which form right angle joints at opposing ends of the affixed extruded element between the other two;
a plurality of drive motors mounted each connected to one of a plurality of wheels; and
an actuator motor mounted above the base frame.

11. The robotic assembly of claim 10 further comprising a reinforcing brace consisting essentially of an extruded shaped track element attached widthwise between opposing parallel extruded tack elements.

12. The robotic assembly of claim 10 further comprising a frame side plate having a plurality of tabs included on the frame side plate, where the tabs are adapted to support a robot bumper at a prescribed height above the ground.

13. The robotic assembly of claim 10 further comprising an upper robotic structure affixed to at least some of the extruded track elements.

14. The system of claim 1 wherein each of the sets of extruded elements comprise materials selected from the group consisting of aluminum, aluminum alloys, magnesium, magnesium alloys and compositions thereof.

15. The system of claim 8 wherein the extruded elements comprise materials selected from the group consisting of aluminum, aluminum alloys, magnesium, magnesium alloys and compositions thereof.

16. A construction kit comprising:
at least one first piece having a flat web spanning between a pair of opposing rails, where each rail is located on one of two opposing lengthwise edges of the track element;
at least one second piece having a generally rectangular cross-sectional shape including four webbed sides where each web spans between a pair of opposing elongated rectangular columns or rails, each rail located in a corner of the extruded hollow rectangular shaped element;
at least one third piece having a substantially triangular cross-section including a plurality of first through third webs each spanning between a pair of opposing interior elongated corner rails;
at least one fourth piece having an angle shaped element including a first web and a second web oriented generally perpendicular to the first web where the first web is bordered on opposing lengthwise edges by a pair of opposing elongated rectangular columns or rails, and the second web is bordered on opposing lengthwise edges by a pair of opposing elongated rectangular columns or rails where one of the elongated rectangular columns is common to both opposing pairs and forms a corner between the first web and the second web
wherein each of said opposing lengthwise ends are integrally joined to a rail;
wherein each rail is adapted to be tapped or drilled to accept a fastener; and
wherein each piece is adapted to be flush mounted on at least one surface to any of the other pieces or to the same shape pieces.

17. The construction kit of claim 16 further comprising an extruded symmetric outside angle shaped element including a first web and a second web oriented generally perpendicular to the first web;
wherein the first web is bordered on opposing lengthwise edges by a pair of opposing rails, and the second web is also bordered on opposing lengthwise edges by a second pair of opposing rails, where one of the rails is common to both opposing pairs and located within an inside corner angle between the first web and the second web; and
wherein each of the opposing rails project inwardly with respect to the outside corner angle.

18. The kit of claim 16 wherein the dimensions of the sides of the rails are at least three times the thickness dimension of the webs.

19. The kit of claim 16 further comprising a fabrication tool to facilitate precise drilling and tapping of fastener holes for attaching the shapes to one another the tool including:
a 90 degree angle plate with a short side and a longer side where the short side has a first set of multiple drill bushings placed into it such that when the tool is clamped on the extrusion with a suitable clamping means, the drill bushings in the short side allow fastener holes to be accurately drilled and tapped in the center of the edge of the reinforcement square to and accurately spaced so that the tapped holes will line up with through fastener holes drilled with the tool on another extruded shape;
wherein the long side has a second set of multiple drill bushings placed into it such that when the tool is clamped on the extrusion, the drill bushings in the long side will facilitate drilling fastener clearance holes in the face of the extrusion precisely lined up with and square to the center of the reinforced edges, and in suitable patterns to match the fastener holes tapped in the centers of the ends of the reinforcements in the appropriate shapes;
a top plate fastened to the end of the angle plate, with a third set of drill bushings incorporated and located to facilitate drilling and tapping fastener holes centered with and square to the reinforced edges and corners of the extrusion.

20. The kit of claim 19 wherein the top plate can be unfastened and rotated 180 degrees and refastened in order to change from the guided drilling operation to the guided tapping operation.

21. The kit of claim 18 wherein the extruded elements comprise materials selected from the group consisting of aluminum, aluminum alloys, magnesium, magnesium alloys and compositions thereof.

22. The kit of claim 21 further comprising a fabrication tool to facilitate precise drilling and tapping of fastener holes for attaching the shapes to one another the tool including:
  a 90 degree angle plate with a short side and a longer side where the short side has a first set of multiple drill bushings placed into it such that when the tool is clamped on the extrusion with a suitable clamping means, the drill bushings in the short side allow fastener holes to be accurately drilled and tapped in the center of the edge of the reinforcement square to and accurately spaced so that the tapped holes will line up with through fastener holes drilled with the tool on another extruded shape;
  wherein the long side has a second set of multiple drill bushings placed into it such that when the tool is clamped on the extrusion, the drill bushings in the long side will facilitate drilling fastener clearance holes in the face of the extrusion precisely lined up with and square to the center of the reinforced edges, and in suitable patterns to match the fastener holes tapped in the centers of the ends of the reinforcements in the appropriate shapes; and
  a top plate fastened to the end of the angle plate, with a third set of drill bushings incorporated and located to facilitate drilling and tapping fastener holes centered with and square to the reinforced edges and corners of the extrusion.

23. The system of claim 3 wherein the sides of the reinforced squares are more than 3 times the thickness of the web and the material is one of aluminum alloy or magnesium alloy.

24. The system of claim 4 wherein the sides of the reinforced squares are more than 3 times the thickness of the web and the material is one of aluminum alloy or magnesium alloy.

25. The system of claim 7 wherein the sides of the reinforced squares are more than 3 times the predetermined thickness of the flat or thinnest portion of the web and the material is one of aluminum alloy or magnesium alloy.

26. The system of claim 25 wherein one of the 2 webs is substantially flat and flush with the adjoining reinforcing squares on the outside of the overall angle shape, and the other web is flat and flush with its adjoining reinforcing squares on the inside of the angle, creating an asymmetric angle shape.

* * * * *